(12) United States Patent
Yamamoto

(10) Patent No.: US 9,606,517 B2
(45) Date of Patent: Mar. 28, 2017

(54) ACTUATOR CONTROL METHOD AND ACTUATOR CONTROL DEVICE

(75) Inventor: Yasushi Yamamoto, Chigasaki (JP)

(73) Assignee: ISUZU MOTORS LIMITED, Tokyo (JP)

( * ) Notice: Subject to any disclaimer, the term of this patent is extended or adjusted under 35 U.S.C. 154(b) by 391 days.

(21) Appl. No.: 14/241,366

(22) PCT Filed: Aug. 10, 2012

(86) PCT No.: PCT/JP2012/070476
§ 371 (c)(1),
(2), (4) Date: Feb. 26, 2014

(87) PCT Pub. No.: WO2013/031521
PCT Pub. Date: Mar. 7, 2013

(65) Prior Publication Data
US 2014/0229013 A1 Aug. 14, 2014

(30) Foreign Application Priority Data
Aug. 29, 2011 (JP) ................. 2011-186051

(51) Int. Cl.
*G06F 7/70* (2006.01)
*G05B 13/02* (2006.01)
(Continued)

(52) U.S. Cl.
CPC ............ *G05B 13/02* (2013.01); *G05B 19/23* (2013.01); *G05B 19/29* (2013.01); *G05B 19/35* (2013.01);
(Continued)

(58) Field of Classification Search
CPC ........ G05B 13/02; G05B 19/23; G05B 19/29; G05B 19/35; G05B 19/416;
(Continued)

(56) References Cited

U.S. PATENT DOCUMENTS 3,835,360 A * 9/1974 Kiwiet ................ G05B 19/253
318/561
4,488,242 A * 12/1984 Tabata .................. G05B 19/39
318/561

(Continued)

FOREIGN PATENT DOCUMENTS

| CN | 1462915 | 12/2003 |
| DE | 10361132 A1 | 1/2005 |

(Continued)

OTHER PUBLICATIONS

Annex to the European Search Report dated Dec. 8, 2015 in corresponding European Patent Application No. 12827117.
(Continued)

*Primary Examiner* — Shardul Patel
(74) *Attorney, Agent, or Firm* — Staas & Halsey LLP

(57) ABSTRACT

An actuator control method and an actuator control device that perform energy evaluation control that compares kinetic energy of a controlled object and work that can be done by braking and switches driving to braking at a point of time at which the kinetic energy of the controlled object and the work become equal, and also repeatedly makes a comparison between the kinetic energy of the controlled object and the work at each preset time, as a new control method that replaces PID control in mechanics for effectively utilizing vehicle energy to improve vehicle fuel consumption and control methods thereof, a control result is obtained by a simpler method.

20 Claims, 10 Drawing Sheets

(51) Int. Cl.
*G05B 19/416* (2006.01)
*G05B 19/23* (2006.01)
*G05B 19/29* (2006.01)
*G05B 19/35* (2006.01)

(52) U.S. Cl.
CPC .. *G05B 19/416* (2013.01); *G05B 2219/34311* (2013.01); *G05B 2219/43045* (2013.01); *G05B 2219/43064* (2013.01)

(58) Field of Classification Search
CPC .......... G05B 2219/34311; G05B 2219/43045; G05B 2219/43064
USPC ............ 701/70; 700/275; 318/560, 561, 376
See application file for complete search history.

(56) References Cited

U.S. PATENT DOCUMENTS

| | | | | |
|---|---|---|---|---|
| 5,119,250 | A * | 6/1992 | Green | G11B 21/083 318/561 |
| 6,166,504 | A * | 12/2000 | Iida | B25J 9/1674 318/560 |
| 2005/0189895 | A1 * | 9/2005 | Muroi | B41J 19/202 318/376 |

FOREIGN PATENT DOCUMENTS

| | | |
|---|---|---|
| EP | 0461915 A2 | 12/1991 |
| GB | 2273177 A | 6/1994 |
| JP | 61-77905 | 4/1986 |
| JP | 5-224702 | 9/1993 |
| JP | 6-102934 | 4/1994 |
| JP | 7-302121 | 11/1995 |
| JP | 2000-94371 | 4/2000 |

OTHER PUBLICATIONS

Patent Abstracts of Japan, Publication No. 06-102934, Published Apr. 15, 1994.
Patent Abstracts of Japan, Publication No. 07-302121, Published Nov. 14, 1995.
Patent Abstracts of Japan, Publication No. 05-224702, Published Sep. 3, 1993.
Patent Abstracts of Japan, Publication No. 61-77905, Published Apr. 21, 1986.
Patent Abstracts of Japan, Publication No. 2000-94371, Published Apr. 4, 2000.
International Search Report dated Sep. 4, 2012 in PCT/JP2012/070476.

* cited by examiner

US 9,606,517 B2

ACTUATOR CONTROL METHOD AND ACTUATOR CONTROL DEVICE

TECHNICAL FIELD

This application claims the benefit under 35 U.S.C. Section 371, of PCT International Application No. PCT/JP2012/070476, filed Aug. 10, 2012, and under 35 U.S.C. §119 of Japanese Application No. 2011-186051 filed Aug. 29, 2011, the contents of which are incorporated herein by reference.

The present invention relates to an actuator control method and an actuator control device and, in more detail, to an actuator control method and an actuator control device the amount of calculation of which is comparatively small and which are capable of incorporating the element of feedback.

BACKGROUND ART

In the conventional control, the feedback control by proportional-integral-derivative ("PID") control is generally used. In the PID control, a control output is always determined with a delay from a phenomenon, and therefore, if each control gain of PID is increased in an attempt to increase the control speed, the control no longer catches up with the phenomenon, and therefore, the control becomes unstable. In particular, if a mechanical damping force of a controlled object reduces remarkably, the control tends to become unstable and there is a case where the control diverges. As a method for determining each control gain of the PID control in order to avoid the instability of control, a control theory, such as an H∞, capable of ensuring the stability of control is applied. However, under the restrictions of the PID control, overshoot and delay in control occur due to load fluctuation.

In the PID control also, if sliding mode control is used, it is possible to theoretically eliminate the influence of load fluctuation by switching control gains in accordance with the control state. However, if the control period is lengthened, this control keeps oscillating and no longer converges. Because of this, in order to completely eliminate the influence of load fluctuation, it is necessary to switch control gains at infinitely high speed, and control at speed that can be said as infinitely high speed for a phenomenon will be necessary. Further, adjustment of each control gain, such as PID, is necessary and the quality of the adjustment of control gain determines the quality of control, and therefore, the adjustment of control gain becomes a very important factor.

Furthermore, these control theories are for making up for faults of the PID control and are not methods designed for the purpose of control to "stop a controlled object at a target position in the shortest time". Because of this, for this simple purpose, it can be said that the time optimal control is a control method more suitable to the purpose rather than the PID control.

The simplest time optimal control is a control to stop a controlled object at a target position by accelerating the controlled object by a maximum thrust force up to the middle on the way to the target position and by decelerating it at a maximum deceleration for the rest of the way. This output pattern is determined before the control is started, and therefore, the time optimal control can be referred to as feedforward control.

In other words, the time optimal control is a control method for moving a controlled object by a maximum driving force of an actuator and stopping by a maximum braking force, and is control capable of stopping the controlled object at the target in the shortest time in terms of theory. That is, the time optimal control is a control method that perfectly meets the purpose of control to "stop a controlled object at a target position in the shortest time".

For example, as described in Japanese patent application Kokai publication No. 2000-94371, as a control device using the time optimal control, the time optimal control device of a robot is proposed, which includes a control unit configured to control a servomotor, a correspondence relationship storage unit configured to store a relationship between a controlled variable on the basis of the value at the time of no load and a load weight, a load estimation calculation unit, an acceleration/deceleration constant determination unit configured to determine acceleration/deceleration constants based on workpiece information calculated by the load estimation calculation unit, and a command creation unit configured to create a command to be delivered to the servo control unit using the determined acceleration/deceleration constants, and which lengthens the acceleration time when grasping a workpiece and shortens the acceleration time when not grasping a workpiece.

However, while the time optimal control is an ideal control capable of control with the shortest time in terms of theory, it is an open control in which the output pattern is determined by taking into consideration the initial velocity, the maximum acceleration, and the maximum deceleration, and because there is no feedback element, there is such a problem that no modification method is available when the target value and the controlled value do not agree and it is difficult to cause the target value and the controlled value to agree accurately, and therefore, it is rarely adopted in actual control.

PRIOR ART DOCUMENT

Patent Document 1: Japanese patent application Kokai publication No. 2000-94371

SUMMARY OF THE INVENTION

In contrast to this, the present inventors have thought out an actuator control method and an actuator control device that perform "feedback time optimal control" that uses time optimal control and which: calculates a switching time at which an acceleration output is switched to a deceleration output and an end time of the deceleration output expressed by time elapsed from a calculation time at which calculation for control is performed using a maximum acceleration and a maximum deceleration, which are measured in advance, at the time of a maximum output of control force of the actuator; and sets the control force of the actuator to a maximum acceleration output from the calculation time to the switching time, sets the control force of the actuator to a maximum deceleration output from the switching time to the end time, and ends the output of control force at the end time, and which also calculates and updates the switching time and the end time by repeating the calculation step at each preset time, and further, the inventors of the present invention have made an attempt to reduce the control output as residual energy, which is the sum of work that remains and kinetic energy of the control system reduces.

These control method and control device have incorporated the element of feedback that updates the switching time and the end time at each preset time by inputting deviation between the target value and the controlled value at each time of control, and therefore, even if the external force changes, or without shortening the time interval of control, it is possible to obtain the effect that a stable control result can be obtained at all times.

Although in the control method and the control device that perform the "feedback time optimal control", it is confirmed that they are more stable and higher in speed than the PID control, it is necessary to find solutions of a quadratic function, and therefore, in the case where the calculation load is heavy and the performance of a controller is low, there arises such a problem that they cannot be applied unless the control period is lengthened.

The present invention has been developed in view of the above-mentioned circumstances and an object thereof is to provide an actuator control method and an actuator control device capable of obtaining a control result substantially the same as that of the "feedback time optimal control" by a simpler method as a new control method that replaces the PID control.

The actuator control method of the present invention in order to achieve the above-mentioned object is a method, including the steps of: comparing kinetic energy of a controlled object and work that can be done by braking; switching driving to braking at a point of time at which the kinetic energy of the controlled object and the work that can be done by braking become equal; and repeatedly making a comparison between the kinetic energy of the controlled object and the work that can be done by braking at each preset time.

In this method, "work that can be done by braking=amount of work done by braking=(target potion−present position)×braking force" holds and the point of time at which driving (acceleration) and braking (deceleration) are switched is the point of time at which "kinetic energy=work that can be done by braking=(target position−present position)×braking force" holds. The braking directions of the work that can be done by braking are switched in accordance with plus/minus of deviation (=target position−present position).

According to this method, it is made possible to cause the controlled value to agree with the target value in the shortest time even by the ON/OFF control and it is also made possible to follow a change in acceleration in the control system due to load fluctuation etc. Further, calculation becomes very simple, and therefore, the amount of calculation becomes remarkably small and the calculation load of a controller can be reduced. Furthermore, control is performed by a comparison between amounts of energy, and therefore, the physical meaning becomes clear.

In the above-mentioned actuator control method, if the sum of the kinetic energy of the controlled object and the absolute value of the work that can be done by braking is taken to be a control evaluation value to end control and the upper limit value of a control output is reduced in proportion to the control evaluation value, that is, if "control evaluation value=(½)×v²+|(target position−present position)×braking acceleration|" is caused to hold and the control output is taken to be a value obtained by multiplying the maximum control output by the evaluation value and an E gain, that is, "control output=control evaluation value×E gain×maximum control output", it is possible to reduce the control output to zero when the control ends. In this case, as a matter of course, the control output is not set equal to or more than the maximum control output, and therefore, the upper limit value of "control evaluation value×E gain" is set to 1.0.

Moreover, in the above-mentioned actuator control method, if the point of time at which the control evaluation value is zero is regarded as the end of control, it is possible to determine that the time when the deviation and the velocity become zero at the same time as the end of control.

Further, in the above-mentioned actuator control method, if control is performed by replacing the kinetic energy with "(kinetic energy)−(kinetic energy at target velocity)", that is, if control is performed by setting the target position and the target velocity and by subtracting the kinetic energy at the target velocity from the kinetic energy calculated from the change in the amount of deviation, it is made possible to perform control by simultaneously giving the target position and the target velocity at the target position, and therefore, it is made possible to cause the position and the velocity to agree with the target values at the same time.

Then, the actuator control device of the present invention in order to achieve the above-mentioned object is configured so as to include: a comparison unit configured to compare kinetic energy of a controlled object and work that can be done by braking; and a switching unit configured to switch driving to braking at a point of time at which the kinetic energy of the controlled object and the work that can be done by braking become equal, and to repeatedly make a comparison between the kinetic energy of the controlled object and the work that can be done by braking by the comparison unit at each preset time.

With this configuration, it is made possible to cause the controlled value to agree with the target value in the shortest time even by the ON/OFF control and it is also made possible to follow a change in acceleration in the control system due to load fluctuation etc. Further, calculation becomes very simple, and therefore, the amount of calculation becomes remarkably small and the calculation load of a controller can be reduced. Furthermore, control is performed by a comparison between amounts of energy, and therefore, the physical meaning becomes clear.

By configuring the above-mentioned actuator control device so as to include an evaluation value calculation unit configured to take a sum of the kinetic energy of the controlled object and the absolute value of the work that can be done by braking to be a control evaluation value to end control and a control output limiting unit configured to reduce the upper limit value of the control output in proportion to the control evaluation value, it is possible to reduce the control output to zero when the control ends.

Further, by configuring the above-mentioned actuator control device so as to include a control ending unit configured to end control at the point of time at which the control evaluation value is zero, it is possible to determine that the time when the deviation and the velocity become zero at the same time as the end of control.

Furthermore, by configuring the above-mentioned actuator control device so as to include a correction unit configured to replace the kinetic energy with "(kinetic energy)−(kinetic energy at target velocity)", it is made possible to perform control by simultaneously giving the target position and the target velocity at the target position, and therefore, it is made possible to cause the position and the velocity to agree with the target values at the same time.

In the above-mentioned actuator control method, if the target value is taken to be Tr, the controlled value to be X and a mass to be m, and the kinetic energy is defined by "V=(½)×m×(dX/dt)²" and the amount of the work that can be done by braking by "W=m×αb×(Tr−X)", in a case where deviation (Tr−X) between the target value Tr and the controlled value X is positive, an acceleration αa is set based on a maximum acceleration αp and a deceleration αb based on a maximum deceleration αm and in a case where the deviation (Tr−X) is negative, the acceleration αa is set based on the maximum deceleration αm and the deceleration αb based on the maximum acceleration αp, and further, in a case where the kinetic energy is smaller than the absolute value of the amount of the work that can be done by braking, an output acceleration is set to the acceleration αa and in a case where the kinetic energy is larger than the absolute value of the amount of the work that can be done by braking, the output acceleration is set to the deceleration αb.

Alternatively, in the above-mentioned actuator control method, if the target value is taken to be Tr, the controlled value to be X, a mass to be m, a calculation period to be Δt, the present controlled value to be $X_0$, the controlled value one calculation period before to be $X_{-1}$, and the controlled value two calculation periods before to be $X_{-2}$, and the kinetic energy is defined by "V=(½)×m×[$(X_0-X_{-1})/\Delta t]^2$" and the amount of the work that can be done by braking by "W=m×αb×(Tr−X)", in a case where the deviation (Tr−X) between the target value Tr and the controlled value X is positive, the acceleration αa is set based on the maximum acceleration αp and the deceleration αb based on the maximum deceleration αm and in a case where the deviation (Tr−X) is negative, the acceleration αa is set based on the maximum deceleration αm and the deceleration αb based on the maximum acceleration αp, and further, in a case where the kinetic energy is smaller than the absolute value of the amount of the work that can be done by braking, the output acceleration is set to the acceleration αa and in a case where the kinetic energy is larger than the absolute value of the amount of the work that can be done by braking, the output acceleration is set to the deceleration αb.

According to the actuator control method and the actuator control device according to the present invention, it is made possible to cause the controlled value to agree with the target value in the shortest time even by the ON/OFF control and calculation becomes very simple, and therefore, the amount of calculation becomes remarkably small and the calculation load of a controller can be reduced. Further, control is performed by a comparison between amounts of energy, and therefore, the physical meaning becomes clear.

DESCRIPTION OF EMBODIMENTS

Hereinafter, an actuator control method and an actuator control device of embodiments according to the present invention are explained with reference to the accompanying drawings.

First, "energy evaluation control" of the control law of the present invention is explained.

In the control of an actuator, in the case where an object (controlled object) in motion is stopped, an amount of work that needs to be done to stop the object by a fixed force generated by the actuator is represented by the product of a braking force applied to stop the object and a distance traveled by the object until it stops. That is, "work done by braking=braking force×distance traveled" holds.

At this time, the work done until the object stops becomes equal to the kinetic energy that the object in motion originally has. From this simple principle, it is known that in order to stop the object in motion at the target position, braking (deceleration) is started from the point of time at which "kinetic energy=(target position−present position)×braking force" holds. Conversely, even if the object is kept being driven (accelerated) until this condition is met, it is possible to stop the object at the target position.

That is, in the case where "kinetic energy<(target position−present position)×braking force" holds, "driving (acceleration)" is performed and in the case where "kinetic energy>(target position−present position)×braking force" holds, "braking (deceleration)" is performed.

This is the control law of the present invention and here, this control law is referred to as "energy evaluation control". Further, "(target position−present position)×braking force" represents the amount of work that can be done by braking until the target position is reached and here, the amount of work done by braking is referred to as "work that can be done by braking".

Figure 10:
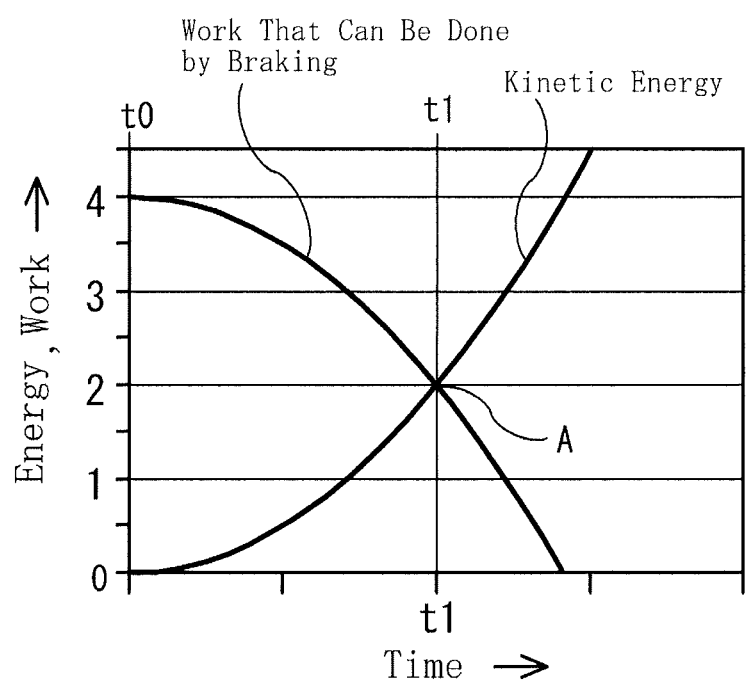
FIG. 10 is a diagram showing a relationship between kinetic energy and work that can be done by braking in a case where driving (acceleration) is performed at constant acceleration.

FIG. 10 shows a relationship between work that can be done by braking and kinetic energy in the case where driving is continued at the maximum acceleration. The kinetic energy is represented by "(½)×m×$v^2$" and the work that can be done by braking by "m×αa×(target position−present position)". Here, m denotes mass, v denotes velocity, and α denotes acceleration.

FIG. 10 shows a relationship between kinetic energy and work that can be done by braking in the case where driving is performed at constant acceleration from a control start point of time (t1) on the assumption that acceleration is "1", deceleration is "−1.", and mass is "1".

In the case of FIG. 10, at the point of time t1, the kinetic energy and the work that can be done by braking become equal (A point), and therefore, if driving ("1") is switched to braking ("−1") at this point of time (t1), it is made possible to stop the object at the target position.

Figure 11:
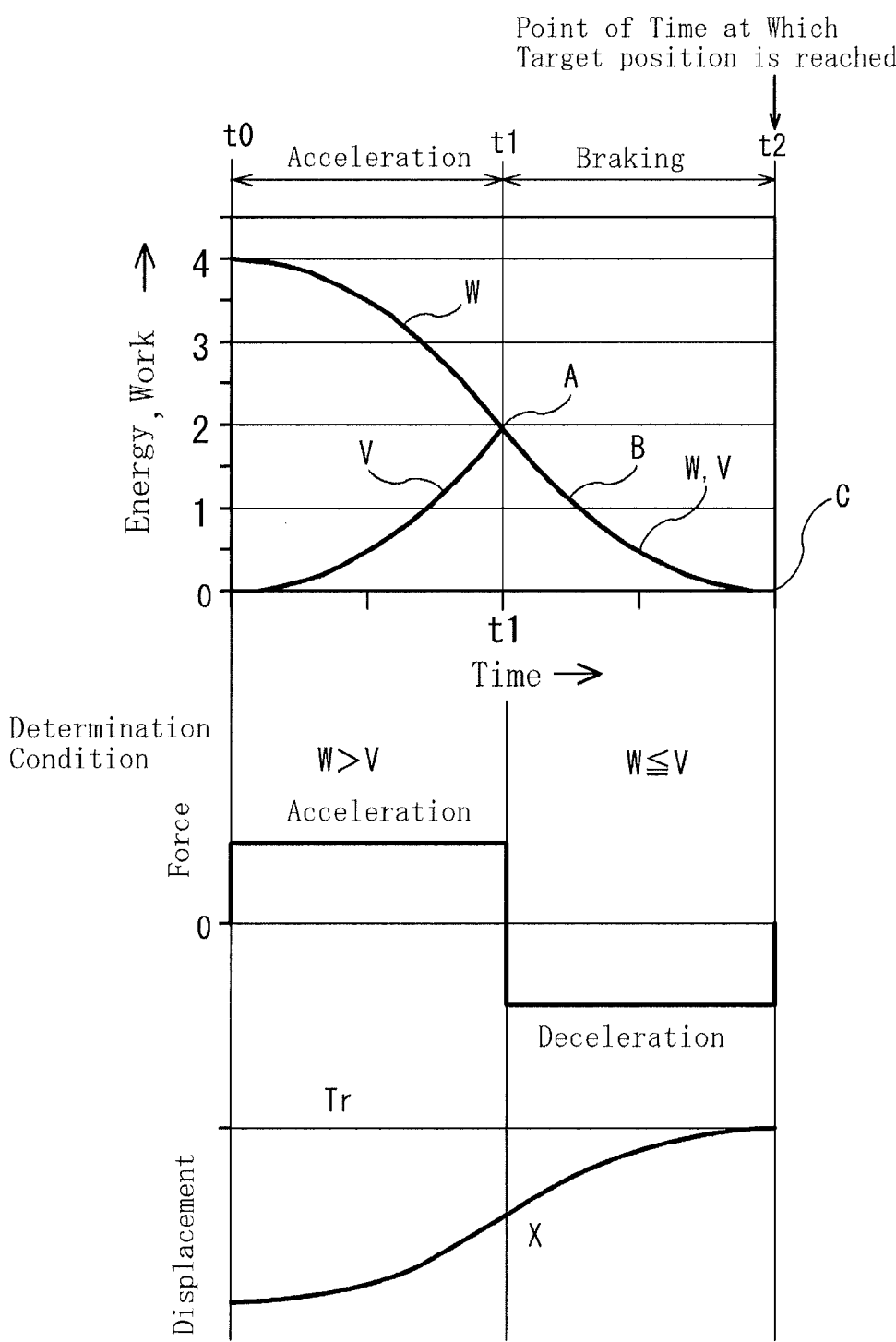
FIG. 11 is a diagram showing a relationship between kinetic energy and work that can be done by braking in a case where braking (deceleration) is started when the kinetic energy and the work that can be done by braking become equal.

FIG. 11 shows a result in the case where driving is switched to braking at the point of time (t1) at which the kinetic energy and the work that can be done by braking become equal. From a point of time t0 to the point of time t1, driving (acceleration) is performed and from the point of time t1 to a point of time t2, braking (deceleration) is performed. From the point of time t1 to the point of time t2, the kinetic energy and the work that can be done by braking converge by tracing the same trajectory. Further, in FIG. 11, at the point of time t2, both the kinetic energy and the work that can be done by braking become zero at the same time and the control ends. At the point of time t2, both the kinetic energy and the work that can be done by braking become zero, and therefore, it is known that the object has stopped at the target position.

By making the comparison between the kinetic energy and the work that can be done by braking at all times during the control, it is also made possible to follow the change in acceleration in the control system by load fluctuation etc.

As described above, by using the "energy evaluation control" of the present control law, it is made possible to cause the controlled value to agree with the target value in the shortest time even by the ON/OFF control. Further, the calculation is made very simple, and therefore, it is made possible to reduce the calculation load of the controller.

In the present control, the control evaluation value for control end evaluation is taken to be the sum of the kinetic energy and the absolute value of the work that can be done by braking. Due to this, it is possible to determine that the time when the deviation and the velocity become zero at the same time as the end of control.

Figure 6:
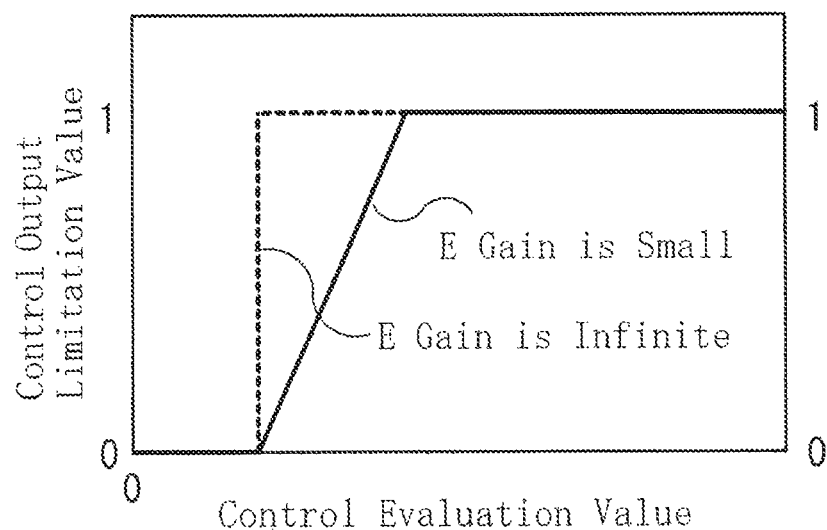
FIG. 6 is a diagram showing a relationship between a control output limitation value, a control evaluation value, and an E gain.
Figure 7:
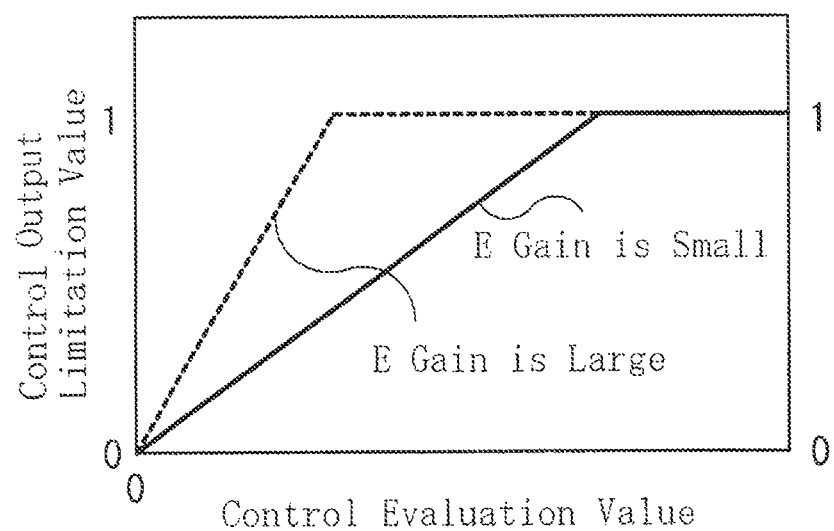
FIG. 7 is another diagram showing the relationship between the control output limitation value, the control evaluation value, and the E gain.

Further, with regard to the control output, a value obtained by multiplying the control evaluation value by an E gain (energy gain) is taken to be a control output limitation value and the upper limit value of the value is set to 1. Furthermore, it is assumed that this value is limited by the maximum value and the minimum value of the control output. Due to this, the control output becomes zero at the time of the end of control. The E gain is a coefficient to reduce the control output accompanying a reduction in the control evaluation value defined by the sum of the kinetic energy and the absolute value of the work that can be done by braking of the control system. The relationship between the E gain, the control output limitation value, and the control evaluation value is shown in FIG. 6 and FIG. 7.

Further, because the kinetic energy and the work that can be done by braking are multiplied by the mass m of the control system, it is made possible to ignore the mass m when comparing both, and therefore, it is assumed that the control evaluation value is defined by "control evaluation value=($\frac{1}{2}$)×v$^2$+|(target position−present position)·braking acceleration|". Due to this, the control output is defined by "control output=control evaluation value×E gain×maximum control output" (however, the control output is assumed to be equal to or less than the maximum control output).

The actuator control device of the first embodiment according to the present invention in order to perform the above-mentioned "energy evaluation control" is configured so as to include: a comparison unit configured to compare kinetic energy of a controlled object and work that can be done by braking; and a switching unit configured to switch driving to braking at the point of time at which the kinetic energy of the controlled object and the work that can be done by braking become equal, to repeatedly make the comparison between the kinetic energy of the controlled object and the work that can be done by braking by the comparison unit at a preset time, and further to include: an evaluation value calculation unit configured to take the sum of the of the kinetic energy of the controlled object and the absolute value of the work that can be done by braking to be a control evaluation value to end control; a control ending unit configured to end control at the point of time at which the control evaluation value is zero; and a control output limiting unit configured to reduce the upper limit value of the control output in proportion to the control evaluation value.

The actuator control method of the first embodiment of the present invention is a method, including the steps of: comparing kinetic energy of a controlled object and work that can be done by braking; switching driving to braking at the point of time at which the kinetic energy of the controlled object and the work that can be done by braking become equal; repeatedly making the comparison between the kinetic energy of the controlled object and the work that can be done by braking at each preset time; further taking the sum of the kinetic energy of the controlled object and the absolute value of the work that can be done by braking to be a control evaluation value to end control; ending control at the point of time at which the control evaluation value is zero; and reducing the upper limit value of the control output in proportion to the control evaluation value.

Figure 1:
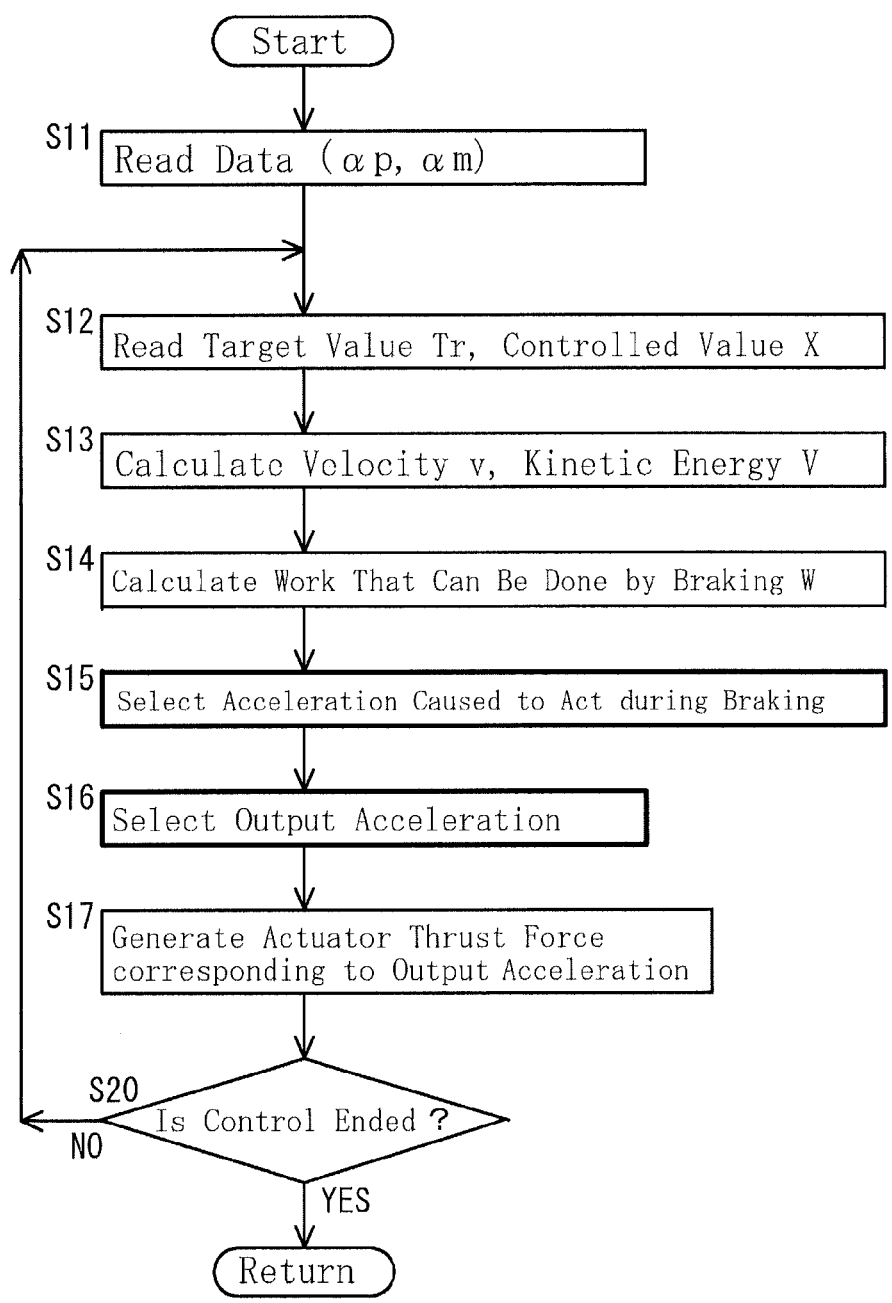
FIG. 1 is a diagram showing a control flow of energy evaluation control of an actuator of a first embodiment according to the present invention.

FIG. 1 shows a control flow of "energy evaluation control" in the case where the output is not caused to converge in the actuator control method of the first embodiment. When the control flow starts in response to a call from an upper control flow, data of the maximum acceleration αp and the maximum deceleration αm is read at step S11.

At the next step S12, a target value Tr and a controlled value X are read and at step S13, the velocity v and kinetic energy V are calculated. If the controlled value read this time is taken to be $X_0$, the controlled value read the previous time, that is, one calculation period before, to be $X_{-1}$, and the calculation period to be Δt, the velocity v will be a first-order derivative of the controlled value X(dX/dt), but in calculation, it is calculated by "v=($X_0$−$X_{-1}$)/Δt". That is, a first-order difference of the controlled value X. Further, the kinetic energy V is calculated by "V=v$^2$/2". At the next step S14, calculation of work that can be done by braking W is performed by "W=αb(Tr−X)".

Figure 2:
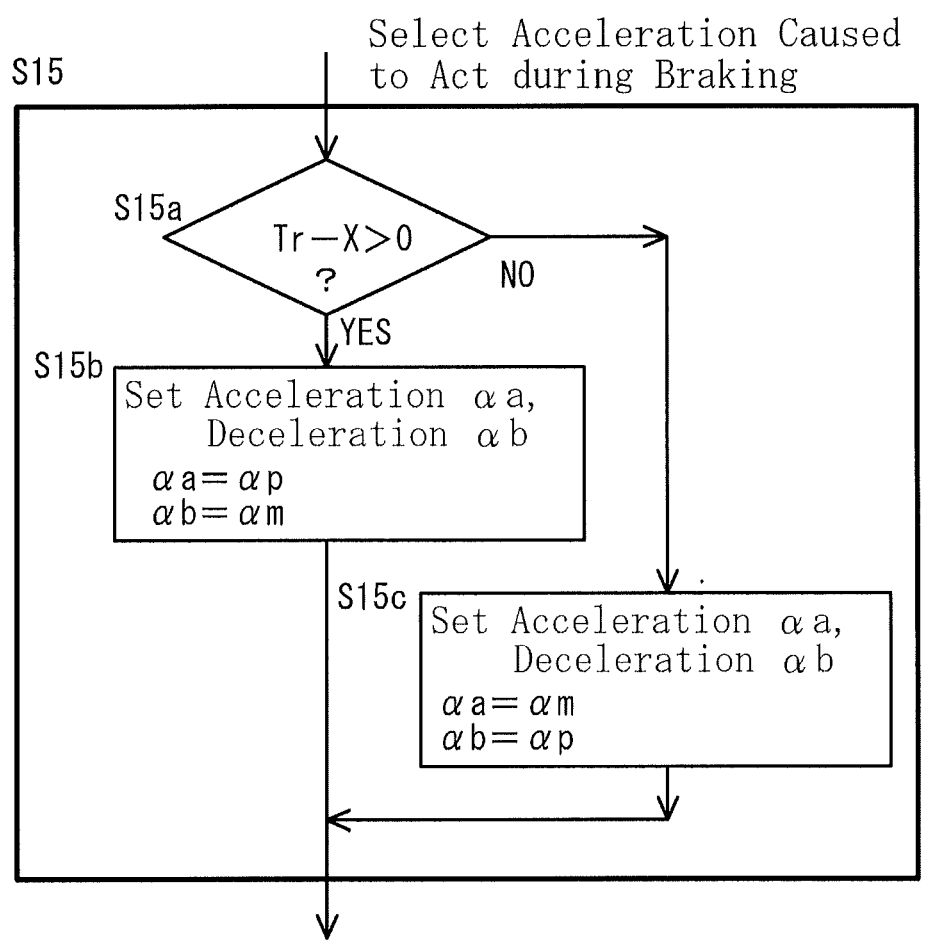
FIG. 2 is a diagram showing a detailed control flow at step S15 of the control flow in FIG. 1.

At the next step S15, acceleration that is caused to act during braking is selected, and in detail, as shown in FIG. 2, at step S15a, whether or not deviation (Tr−X) between the target value Tr and the controlled value X is larger than zero, and in the case where the deviation is larger than zero (YES), at step S15b, an acceleration αa is set to the maximum acceleration αp(αa=αp) and a deceleration αb to the maximum deceleration αm(αb=αm). On the other hand, in the case where the deviation (Tr−X) is not larger than zero (NO), at step S15c, the acceleration αa is set to the maximum deceleration αm (αa=αm) and the deceleration αb to the maximum acceleration αp (αb=αp).

At the next step S16, output acceleration is selected.

Figure 3:
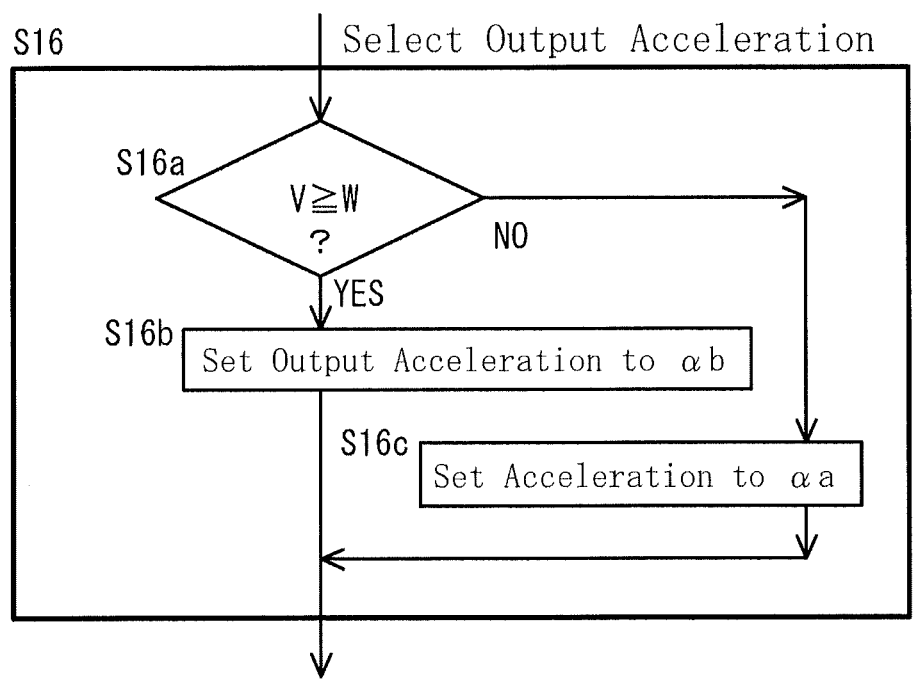
FIG. 3 is a diagram showing a detailed control flow at step S16 of the control flow in FIG. 1.

At this step S16, output acceleration is selected and in detail, as shown in FIG. 3, at step S16a, whether or not the kinetic energy V is larger than the work that can be done by braking W is determined and in the case where the kinetic energy is larger than the work that can be done by braking (YES), at step S16b, αb is selected as the output acceleration (output acceleration=αb). On the other hand, in the case where the kinetic energy V is not larger than the work that can be done by braking W (NO), at step S16c, αa is selected as the output acceleration (output acceleration=αa).

At the next step S17, an actuator thrust force corresponding to the output acceleration is generated. At step S12 to step S17, control corresponding to the one calculation period Δt is performed as a result.

Then, when the control corresponding to the one calculation period Δt is ended, the procedure proceeds to step S20 and determines whether or not the control is ended and in the case where the control is not ended, the procedure returns to step S12 and continues the control. In the case where the control is ended, the procedure proceeds to return and returns to the upper control flow and the control flow in FIG. 1 is ended.

Figure 4:
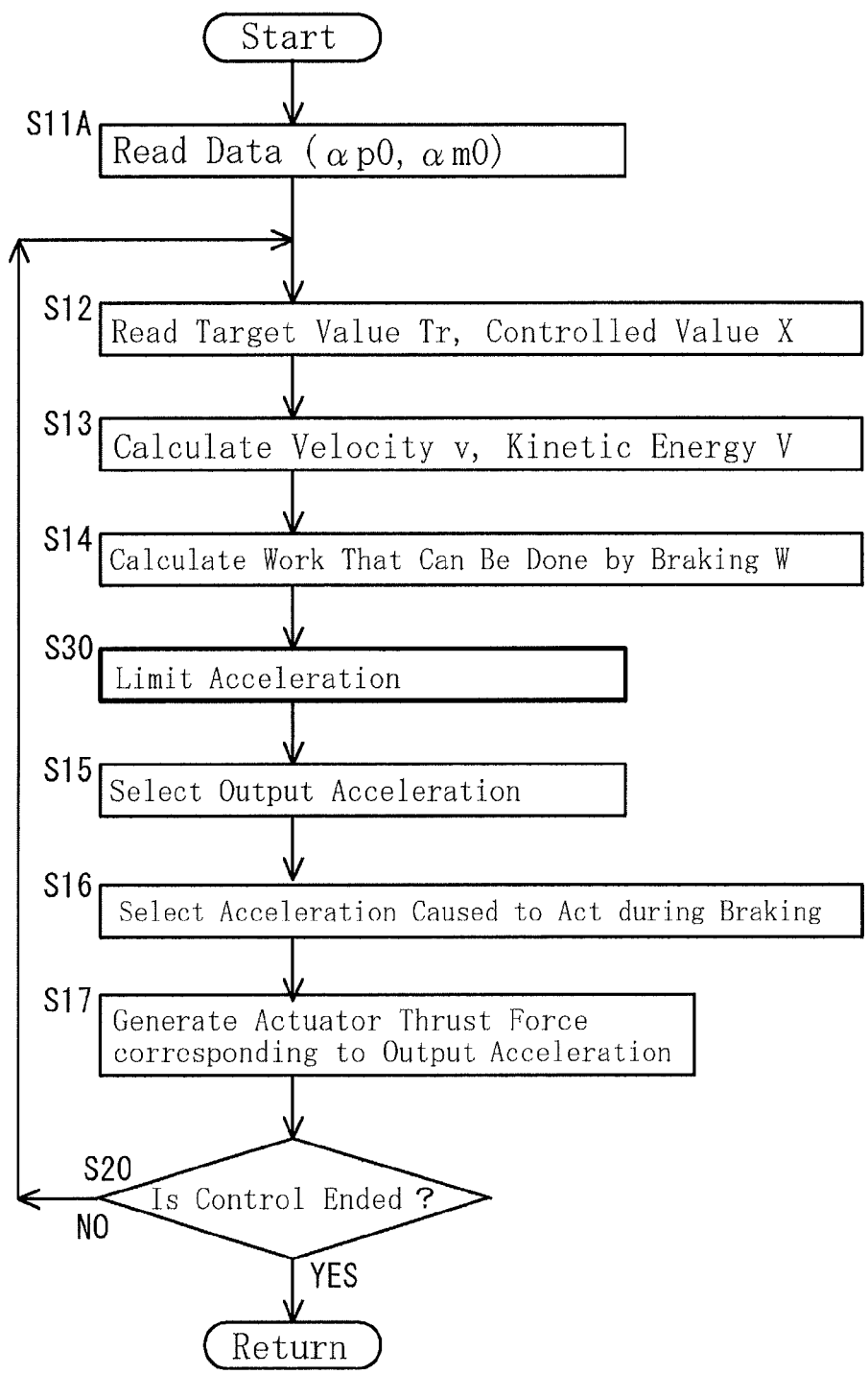
FIG. 4 is a diagram showing another control block of energy evaluation control of an actuator of the first embodiment according to the present invention.

FIG. 4 shows a control flow of "energy evaluation control" in the case where the output is caused to converge in the actuator control method of the first embodiment. When the control flow starts in response to a call from an upper control flow, data of the maximum acceleration αp0 and the maximum deceleration αm0 is read at step S11A. Then, the maximum acceleration αp and the maximum deceleration αm are set so that αp=αp0 and αm=αm0 hold, respectively. However, αp and αm are changed at step S30 according to the control state.

The next step S12 to step S14 are the same as those of the control flow in FIG. 1 and at step S12, the target value Tr and the controlled value X are read, at step S13, the velocity v and the kinetic energy V are calculated, and at step S14, the work that can be done by braking W is calculated.

Figure 5:
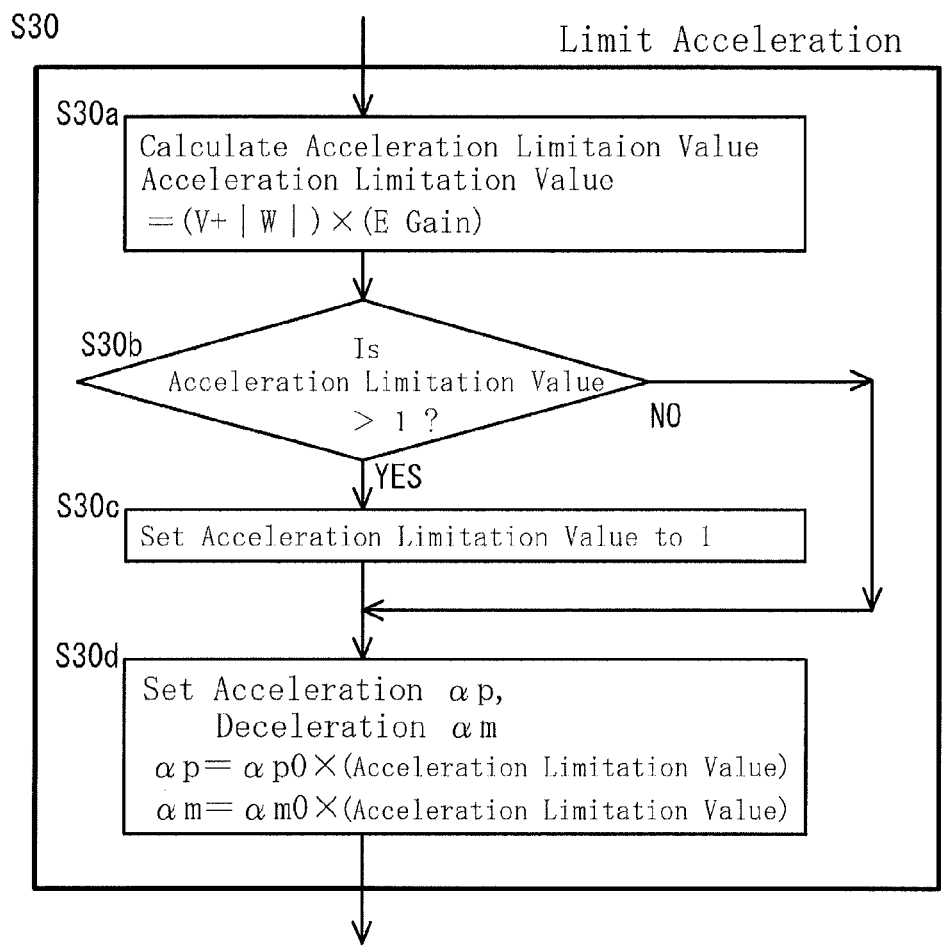
FIG. 5 is a diagram showing a detailed control flow at step S30 of the control flow in FIG. 4.

In the control flow in FIG. 4, after step S14, the limitation of acceleration at step S30 is added. As shown in FIG. 5, at step S30, an acceleration limitation value is calculated by "acceleration limitation value=(V+|W|)×E gain" at step S30a. At the next step S30b, whether or not the calculated acceleration limitation value is larger than 1 is determined and in the case where the acceleration limitation value is larger than 1 (YES), it is set to 1 again (acceleration limitation value=1) at step S30c and in the case where the acceleration limitation value is not larger than 1 (NO), it is left as it is. At step S30d, the maximum acceleration αp and the maximum deceleration αm are set again by "αp=αp0× acceleration limitation value" and "αm=αm0×acceleration limitation value", respectively.

The next step S15 to step S17 are the same as those of the control flow in FIG. 1 to FIG. 3 and at step S15, acceleration caused to act during braking is selected, at step S16, output acceleration is selected, and at step S17, an actuator thrust force corresponding to the output acceleration is generated. At step S12 to step S17, the control corresponding to one calculation period Δt is performed as a result.

Then, when the control corresponding to the one calculation period Δt is ended, the procedure proceeds to step S20 and determines whether or not the control is ended and in the case where the control is not ended, the procedure returns to step S12 and continues the control. In the case where the control is ended, the procedure proceeds to return and returns to the upper control flow and the control flow in FIG. 4 is ended.

According to the actuator control device and the actuator control method of the first embodiment, the above-mentioned "energy evaluation control" can be performed, it is made possible to cause the controlled value to agree with the target value in the shortest time even by the ON/OFF control, and the calculation becomes very simple and the amount of calculation becomes remarkably small because the calculation of a square root is eliminated. Because of this, it is possible to reduce the calculation load of the controller. The calculation to find a square root exerts a heavy load on the controller and there is a case where it is not possible for an inexpensive controller to calculate a square root, and therefore, this is a great merit. Further, the control is performed by a comparison between amounts of energy, and therefore, the physical meaning becomes clear. Furthermore, the control output can be reduced to zero at the time of the end of control and it is possible to determine that the time when the deviation and the velocity become zero at the same time as the end of control.

Figure 8:
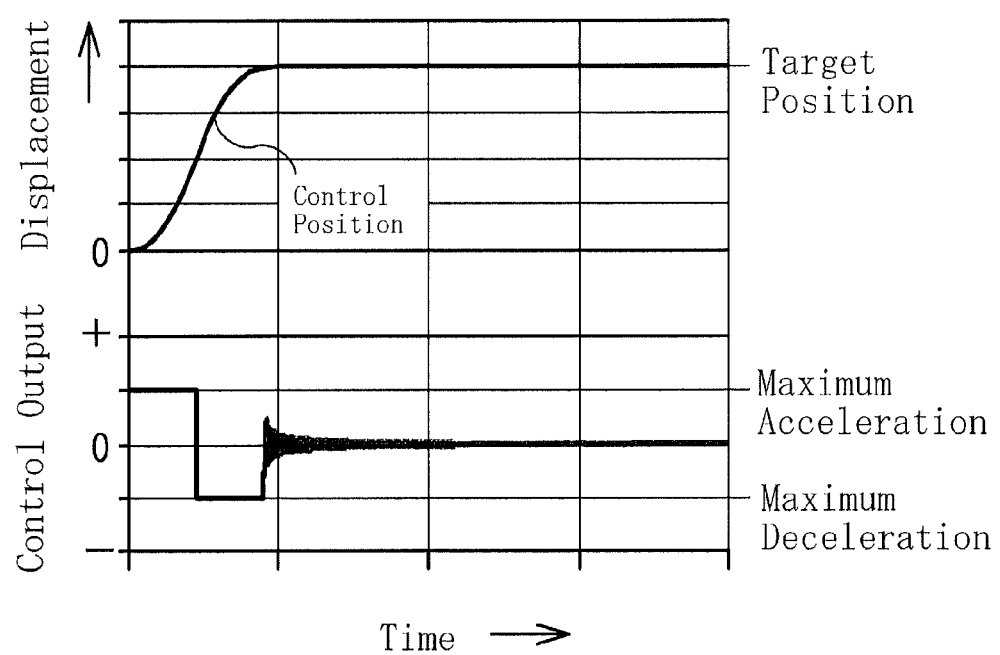
FIG. 8 is a diagram showing a control simulation result by an actuator control method of the first embodiment according to the present invention.

FIG. 8 shows a result when simulation calculation is performed by the "energy evaluation control" (based on the control flow in FIG. 4). The horizontal axis represents time and the vertical axis represents the control output at the lower part and represents the control position at the upper part. In this simulation calculation, the position is displaced from displacement 0 (zero) to the target position. From the result of FIG. 8, it is known that the "energy evaluation control" holds in terms of principles.

Next, an actuator control device and an actuator control method of a second embodiment according to the present invention are explained.

The actuator control device of the second embodiment is configured so as to include a correction unit configured to replace kinetic energy with "(kinetic energy)−(kinetic energy at target velocity)" in addition to the configuration of the actuator control device of the first embodiment.

In the actuator control method of the second embodiment, control is performed by replacing kinetic energy with "(kinetic energy)−(kinetic energy at target velocity)" in the actuator control method of the first embodiment.

That is, a target position and target velocity are set and kinetic energy at the target velocity is subtracted from kinetic energy calculated form the amount of change in deviation.

Due to this, it is made possible to perform control by simultaneously giving the target position and the target velocity at the target position and it is made possible to cause the position and the velocity to agree with the target values at the same time.

In other words, in the actuator control device and the actuator control method of the first embodiment, driving (acceleration) and braking (deceleration) are switched by comparing the remaining work that can be done by braking and the kinetic energy. In the control device and the control method, control is performed for the target that is at rest, but in the actuator control device and the actuator control method of the second embodiment, control is performed for a target in motion to achieve target velocity at a target position.

In the "energy evaluation control" of the first embodiment, driving (acceleration) is performed until the position at which "kinetic energy=(target position−present position)× braking force" holds is reached and braking (deceleration) is performed from this point of time until the target is reached. That is, driving is performed in the state where "kinetic energy<(target position−present position)×braking force" holds and braking is performed in the state where "kinetic energy>(target position−present position)×braking force" holds.

In the "energy evaluation control" of the second embodiment, in order to perform control for a target in motion to achieve target velocity at a target position, it is only required to give target kinetic energy. That is, in the state where "(kinetic energy−target kinetic energy)<(target position−present position)×braking force" holds, driving is performed and in the state where "(kinetic energy−target kinetic energy)>(target position−present position)×braking force" holds, braking is performed.

In other words, control is performed by replacing the "kinetic energy" in the control of the first embodiment with "(kinetic energy)−(kinetic energy at target velocity)". Due to this, the velocity when the target position is reached is the target velocity. Then, the target kinetic energy is obtained by "target kinetic energy=mass×(target velocity)$^2$/2". As in the control of the first embodiment, the mass term may be ignored in control.

Figure 9:
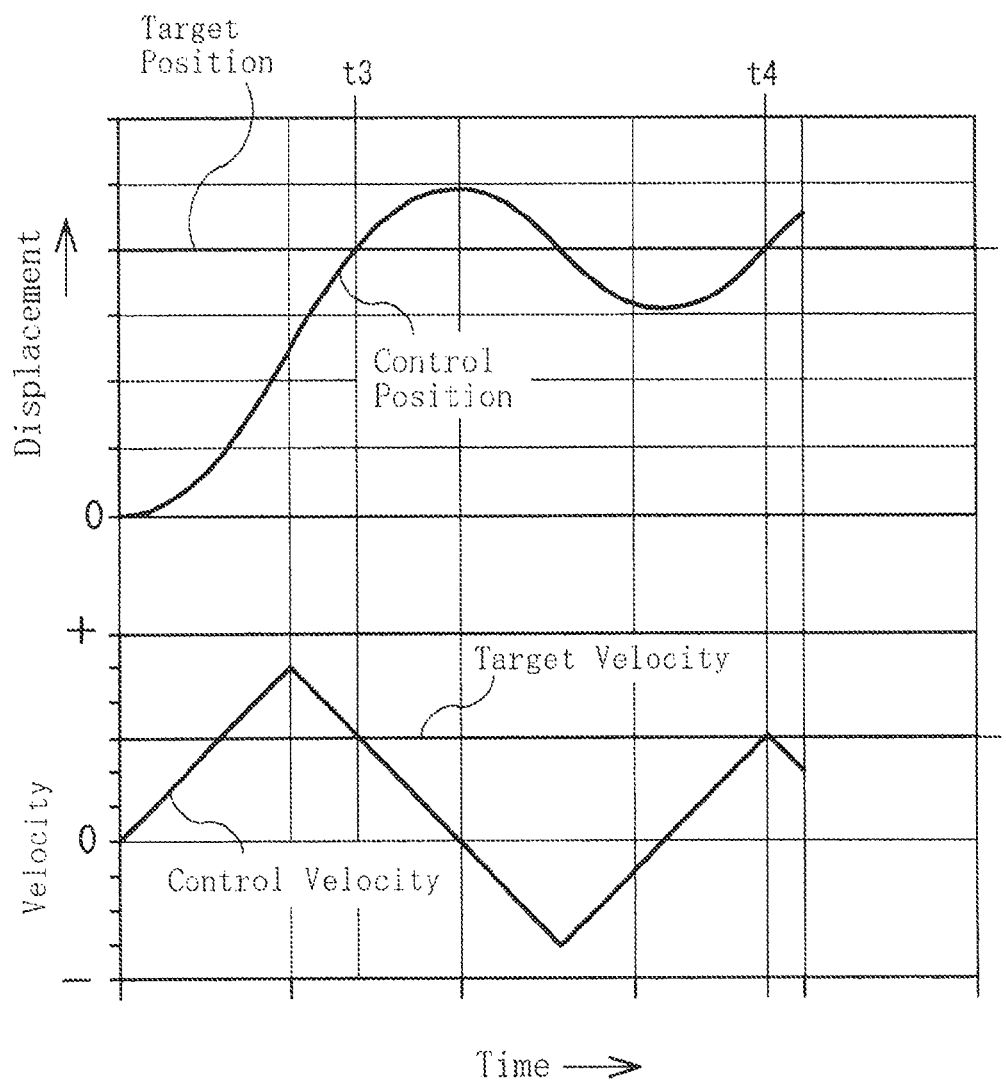
FIG. 9 is a diagram showing a control simulation result by an actuator control method of a second embodiment according to the present invention.

FIG. 9 shows a simulation result when the target velocity is given in the control of the second embodiment. As shown in FIG. 9, it is known that the target velocity is achieved at the instant that the target position is reached (point of time t3, point of time t4).

In the prior art, in order to simultaneously control position and velocity, it is necessary to perform two controls of position control and velocity control separately, but in the "energy evaluation control" of the second embodiment, it is made possible to follow two targets at the same time by perfectly single control. Consequently, the control is very useful as control to follow a target in motion.

According to the actuator control device and the actuator control method of the second embodiment described above, the "energy evaluation control" in which the above-mentioned target velocity is given can be performed, it is made possible to perform control by simultaneously giving the target position and the target velocity at the target position in addition to the effect of the actuator control device and the actuator control method of the first embodiment, and it is made possible to cause the position and the velocity to simultaneously agree with the target values.

According to the actuator control method and the actuator control device of these embodiments, as a new control method that replaces the PID control, the control result substantially equivalent to that of the feedback time optimal control is obtained by a simpler method, and therefore, it is possible to utilize as the control method and the control device of a number of actuators in a number of mechanisms and control methods thereof, such as equipment mounted on automobiles in order to effectively utilize energy of vehicles for improving vehicle fuel consumption.

The invention claimed is:

1. An actuator control method of accelerating and decelerating a controlled object to reach a target position by controlling an output of a control force of an actuator, comprising:
   comparing a kinetic energy of the controlled object with an amount of a work that can be done by braking, which work is defined as the amount of work done by braking the controlled object in motion in a deceleration state until the controlled object reaches the target position from a present position, by a comparison unit of an actuator control device,
   switching from driving to braking when the kinetic energy of the controlled object and the amount of the work that can be done by braking become equal, by a switching unit of the actuator control device;
   repeatedly comparing the kinetic energy of the controlled object with the amount of the work that can be done by braking at each preset time, by the actuator control device;
   taking a sum of the kinetic energy of the controlled object and an absolute value of the amount of the work that can be done by braking, and setting the sum to a control evaluation value for ending control, by the actuator control device; and
   reducing an upper limit value of a control output in proportion to the control evaluation value, by the actuator control device.

2. The actuator control method according to claim 1, further comprising:
   ending the control when the control evaluation value is zero.

3. The actuator control method according to claim 2, further comprising:
   correcting the kinetic energy to "(kinetic energy)−(kinetic energy at target velocity)", when the controlled object has a target velocity at a target position.

4. The actuator control method according to claim 2, wherein, if a target value is taken to be Tr, a controlled value to be X, a mass to be m, and the kinetic energy is defined by "V=($\frac{1}{2}$)×m×(dX/dt)$^2$" and the amount of the work that can be done by braking by "W=m×αb×(Tr−X)", in a case where a deviation (Tr−X) between the target value Tr and the controlled value X is positive, an acceleration (αa) is set based on a maximum acceleration (αp) and a deceleration (αb) based on a maximum deceleration (αm) and, in a case where the deviation (Tr−X) is negative, the acceleration (αa) is set based on the maximum deceleration (αm) and the deceleration (αb) based on the maximum acceleration (αp), and further, in a case where the kinetic energy is smaller than the absolute value of the amount of the work that can be done by braking, output acceleration is set to the acceleration (αa) and, in a case where the kinetic energy is larger than the absolute value of the amount of the work that can be done by braking, the output acceleration is set to the deceleration (αb).

5. The actuator control method according to claim 2, wherein, if a target value is taken to be Tr, a controlled value to be X, a mass to be m, a calculation period to be Δt, a present controlled value to be $X_0$, a controlled value before one calculation period to be $X_{-1}$, and a controlled value before two calculation periods to be $X_{-2}$, and the kinetic energy is defined by "V=($\frac{1}{2}$)×m×[($X_0$−$X_{-1}$)/Δt]$^2$" and the amount of the work that can be done by braking by "W=m×αb×(Tr−X)", in a case where a deviation (Tr−X) between the target value Tr and the controlled value X is positive, an acceleration (αa) is set based on a maximum acceleration (αp) and a deceleration (αb) based on a maximum deceleration (αm) and, in a case where the deviation (Tr−X) is negative, the acceleration (αa) is set based on the maximum deceleration (αm) and the deceleration (αb) based on the maximum acceleration (αp), and further, in a case where the kinetic energy is smaller than the absolute value of the amount of the work that can be done by braking, output acceleration is set to the acceleration (αa) and, in a case where the kinetic energy is larger than the absolute value of the amount of the work that can be done by braking, the output acceleration is set to the deceleration (αb).

6. The actuator control method according to claim 1 further comprising:
   correcting the kinetic energy to "(kinetic energy)−(kinetic energy at target velocity)", when the controlled object has a target velocity at a target position.

7. The actuator control method according to claim 6, wherein, if a target value is taken to be Tr, a controlled value to be X, a mass to be m, and the kinetic energy is defined by "V=($\frac{1}{2}$)×m×(dX/dt)$^2$" and the amount of the work that can be done by braking by "W=m×αb×(Tr−X)", in a case where a deviation (Tr−X) between the target value Tr and the controlled value X is positive, an acceleration (αa) is set based on a maximum acceleration (αp) and a deceleration (αb) based on a maximum deceleration (αm) and, in a case where the deviation (Tr−X) is negative, the acceleration (αa) is set based on the maximum deceleration (αm) and the deceleration (αb) based on the maximum acceleration (αp), and further, in a case where the kinetic energy is smaller than the absolute value of the amount of the work that can be done by braking, output acceleration is set to the acceleration (αa) and, in a case where the kinetic energy is larger than the absolute value of the amount of the work that can be done by braking, the output acceleration is set to the deceleration ($\alpha$b).

8. The actuator control method according to claim 6, wherein, if a target value is taken to be Tr, a controlled value to be X, a mass to be m, a calculation period to be $\Delta$t, a present controlled value to be $X_0$, a controlled value before one calculation period to be $X_{-1}$, and a controlled value before two calculation periods to be $X_{-2}$, and the kinetic energy is defined by "$V=(1/2) \times m \times [(X_0 - X_{-1})/\Delta t]^2$" and the amount of the work that can be done by braking by "$W = m \times \alpha b \times (Tr-X)$", in a case where a deviation (Tr-X) between the target value Tr and the controlled value X is positive, an acceleration ($\alpha$a) is set based on a maximum acceleration ($\alpha$p) and a deceleration ($\alpha$b) based on a maximum deceleration ($\alpha$m) and, in a case where the deviation (Tr-X) is negative, the acceleration ($\alpha$a) is set based on the maximum deceleration ($\alpha$m) and the deceleration ($\alpha$b) based on the maximum acceleration ($\alpha$p), and further, in a case where the kinetic energy is smaller than the absolute value of the amount of the work that can be done by braking, output acceleration is set to the acceleration ($\alpha$a) and, in a case where the kinetic energy is larger than the absolute value of the amount of the work that can be done by braking, the output acceleration is set to the deceleration ($\alpha$b).

9. The actuator control method according to claim 1, wherein, if a target value is taken to be Tr, a controlled value to be X, a mass to be m, and the kinetic energy is defined by "$V=(1/2) \times m \times (dX/dt)^2$" and the amount of the work that can be done by braking by "$W=m \times \alpha b \times (Tr-X)$", in a case where a deviation (Tr-X) between the target value Tr and the controlled value X is positive, an acceleration ($\alpha$a) is set based on a maximum acceleration ($\alpha$p) and a deceleration ($\alpha$b) based on a maximum deceleration ($\alpha$m) and, in a case where the deviation (Tr-X) is negative, the acceleration ($\alpha$a) is set based on the maximum deceleration ($\alpha$m) and the deceleration ($\alpha$b) based on the maximum acceleration ($\alpha$p), and further, in a case where the kinetic energy is smaller than the absolute value of the amount of the work that can be done by braking, output acceleration is set to the acceleration ($\alpha$a) and, in a case where the kinetic energy is larger than the absolute value of the amount of the work that can be done by braking, the output acceleration is set to the deceleration ($\alpha$b).

10. The actuator control method according to claim 1, wherein, if a target value is taken to be Tr, a controlled value to be X, a mass to be m, a calculation period to be $\Delta$t, a present controlled value to be $X_0$, a controlled value before one calculation period to be $X_{-1}$, and a controlled value before two calculation periods to be $X_{-2}$, and the kinetic energy is defined by "$V=(1/2) \times m \times [(X_0-X_{-1})/\Delta t]^2$" and the amount of the work that can be done by braking by "$W=m \times \alpha b \times (Tr-X)$", in a case where a deviation (Tr-X) between the target value Tr and the controlled value X is positive, an acceleration ($\alpha$a) is set based on a maximum acceleration ($\alpha$p) and a deceleration ($\alpha$b) based on a maximum deceleration ($\alpha$m) and, in a case where the deviation (Tr-X) is negative, the acceleration ($\alpha$a) is set based on the maximum deceleration ($\alpha$m) and the deceleration ($\alpha$b) based on the maximum acceleration ($\alpha$p), and further, in a case where the kinetic energy is smaller than the absolute value of the amount of the work that can be done by braking, output acceleration is set to the acceleration ($\alpha$a) and, in a case where the kinetic energy is larger than the absolute value of the amount of the work that can be done by braking, the output acceleration is set to the deceleration ($\alpha$b).

11. An actuator control device for accelerating and decelerating a controlled object to reach a target position by controlling an output of a control force of an actuator, comprising:
a comparison unit configured to compare a kinetic energy of the controlled object with an amount of a work that can be done by braking, which work is defined as the amount of work done by braking the controlled object in motion in a deceleration state until the controlled object reaches the target position from a present position,
a switching unit configured to switch from driving to braking when the kinetic energy of the controlled object and the amount of the work that can be done by braking become equal; and
being configured to compare repeatedly the kinetic energy of the controlled object with the amount of the work that can be done by braking at each preset time;
being configured to take a sum of the kinetic energy of the controlled object and an absolute value of the amount of the work that can be done by braking, and to set the sum to a control evaluation value for ending control; and
being configured to reduce an upper limit value of a control output in proportion to the control evaluation value.

12. The actuator control device according to claim 11, further comprising a control ending unit configured to end control when the control evaluation value is zero.

13. The actuator control device according to claim 12, further comprising a correction unit configured to correct the kinetic energy to "(kinetic energy)–(kinetic energy at target velocity)", when the controlled object has a target velocity at a target position.

14. The actuator control device according to claim 12, wherein, if a target value is taken to be Tr, a controlled value to be X, a mass to be m, a calculation period to be $\Delta$t, a present controlled value to be $X_0$, a controlled value before one calculation period to be $X_{-1}$, and a controlled value before two calculation periods to be $X_{-2}$, and the kinetic energy is defined by "$V=(1/2) \times m \times [(X_0-X_{-1})/\Delta t]^2$" and the amount of the work that can be done by braking by "$W=m \times \alpha b \times (Tr-X)$", in a case where a deviation (Tr-X) between the target value Tr and the controlled value X is positive, an acceleration ($\alpha$a) is set based on a maximum acceleration ($\alpha$p) and a deceleration ($\alpha$b) based on a maximum deceleration ($\alpha$m) and, in a case where the deviation (Tr-X) is negative, the acceleration ($\alpha$a) is set based on the maximum deceleration ($\alpha$m) and the deceleration ($\alpha$b) based on the maximum acceleration ($\alpha$p), and further, in a case where the kinetic energy is smaller than the absolute value of the amount of the work that can be done by braking, output acceleration is set to the acceleration ($\alpha$a) and, in a case where the kinetic energy is larger than the absolute value of the amount of the work that can be done by braking, the output acceleration is set to the deceleration ($\alpha$b).

15. The actuator control device according to claim 12, wherein, if a target value is taken to be Tr, a controlled value to be X, a mass to be m, a calculation period to be $\Delta$t, a present controlled value to be $X_0$, a controlled value before one calculation period to be $X_{-1}$, and a controlled value before two calculation periods to be $X_{-2}$, and the kinetic energy is defined by "$V=(1/2) \times m \times [(X_0-X_{-1})/\Delta t]^2$" and the amount of the work that can be done by braking by "$W=m \times \Delta b \times (Tr-X)$", in a case where a deviation (Tr-X) between the target value Tr and the controlled value X is positive, an acceleration ($\alpha$a) is set based on a maximum acceleration ($\alpha$p) and a deceleration ($\alpha$b) based on a maximum deceleration ($\alpha$m) and, in a case where the deviation (Tr−X) is negative, the acceleration ($\alpha$a) is set based on the maximum deceleration ($\alpha$m) and the deceleration ($\alpha$b) based on the maximum acceleration ($\alpha$p), and further, in a case where the kinetic energy is smaller than the absolute value of the amount of the work that can be done by braking, output acceleration is set to the acceleration ($\alpha$a) and, in a case where the kinetic energy is larger than the absolute value of the amount of the work that can be done by braking, the output acceleration is set to the deceleration ($\alpha$b).

16. The actuator control device according to claim 11, further comprising, a correction unit configured to correct the kinetic energy to "(kinetic energy)−(kinetic energy at target velocity)", when the controlled object has a target velocity at a target position.

17. The actuator control device according to claim 16, wherein, if a target value is taken to be Tr, a controlled value to be X, a mass to be m, a calculation period to be $\Delta t$, a present controlled value to be $X_0$, a controlled value before one calculation period to be $X_{-1}$, and a controlled value before two calculation periods to be $X_{-2}$, and the kinetic energy is defined by "$V=(1/2) \times m \times [(X_0 - X_{-1})/\Delta t]^2$" and the amount of the work that can be done by braking by "$W=m \times \alpha b \times (Tr-X)$", in a case where a deviation (Tr−X) between the target value Tr and the controlled value X is positive, an acceleration ($\alpha$a) is set based on a maximum acceleration ($\alpha$p) and a deceleration ($\alpha$b) based on a maximum deceleration ($\alpha$m) and, in a case where the deviation (Tr−X) is negative, the acceleration ($\alpha$a) is set based on the maximum deceleration ($\alpha$m) and the deceleration ($\alpha$b) based on the maximum acceleration ($\alpha$p), and further, in a case where the kinetic energy is smaller than the absolute value of the amount of the work that can be done by braking, output acceleration is set to the acceleration ($\alpha$a) and, in a case where the kinetic energy is larger than the absolute value of the amount of the work that can be done by braking, the output acceleration is set to the deceleration ($\alpha$b).

18. The actuator control device according to claim 16, wherein, if a target value is taken to be Tr, a controlled value to be X, a mass to be m, a calculation period to be $\Delta t$, a present controlled value to be $X_0$, a controlled value before one calculation period to be $X_{-1}$, and a controlled value before two calculation periods to be $X_{-2}$, and the kinetic energy is defined by "$V=(1/2) \times m \times [(X_0 - X_{-1})/\Delta t]^2$" and the amount of the work that can be done by braking by "$W=m \times \alpha b \times (Tr-X)$", in a case where a deviation (Tr−X) between the target value Tr and the controlled value X is positive, an acceleration ($\alpha$a) is set based on a maximum acceleration ($\alpha$p) and a deceleration ($\alpha$b) based on a maximum deceleration ($\alpha$m) and, in a case where the deviation (Tr−X) is negative, the acceleration ($\alpha$a) is set based on the maximum deceleration ($\alpha$m) and the deceleration ($\alpha$b) based on the maximum acceleration ($\alpha$p), and further, in a case where the kinetic energy is smaller than the absolute value of the amount of the work that can be done by braking, output acceleration is set to the acceleration ($\alpha$a) and, in a case where the kinetic energy is larger than the absolute value of the amount of the work that can be done by braking, the output acceleration is set to the deceleration ($\alpha$b).

19. The actuator control device according to claim 11, wherein, if a target value is taken to be Tr, a controlled value to be X, a mass to be m, and the kinetic energy is defined by "$V=(1/2) \times m \times (dX/dt)^2$" and the amount of the work that can be done by braking by "$W=m \times \alpha b \times (Tr-X)$", in a case where a deviation (Tr−X) between the target value Tr and the controlled value X is positive, an acceleration ($\alpha$a) is set based on a maximum acceleration ($\alpha$p) and a deceleration ($\alpha$b) based on a maximum deceleration ($\alpha$m) and, in a case where the deviation (Tr−X) is negative, the acceleration ($\alpha$a) is set based on the maximum deceleration ($\alpha$m) and the deceleration ($\alpha$b) based on the maximum acceleration ($\alpha$p), and further, in a case where the kinetic energy is smaller than the absolute value of the amount of the work that can be done by braking, output acceleration is set to the acceleration ($\alpha$a) and, in a case where the kinetic energy is larger than the absolute value of the amount of the work that can be done by braking, the output acceleration is set to the deceleration ($\alpha$b).

20. The actuator control device according to claim 11, wherein, if a target value is taken to be Tr, a controlled value to be X, a mass to be m, a calculation period to be $\Delta t$, a present controlled value to be $X_0$, a controlled value before one calculation period to be $X_{-1}$, and a controlled value before two calculation periods to be $X_{-2}$, and the kinetic energy is defined by "$V=(1/2) \times m \times [(X_0 - X_{-1})/\Delta t]^2$" and the amount of the work that can be done by braking by "$W=m \times \alpha b \times (Tr-X)$", in a case where a deviation (Tr−X) between the target value Tr and the controlled value X is positive, an acceleration ($\alpha$a) is set based on a maximum acceleration ($\alpha$p) and a deceleration ($\alpha$b) based on a maximum deceleration ($\alpha$m) and, in a case where the deviation (Tr−X) is negative, the acceleration ($\alpha$a) is set based on the maximum deceleration ($\alpha$m) and the deceleration ($\alpha$b) based on the maximum acceleration ($\alpha$p), and further, in a case where the kinetic energy is smaller than the absolute value of the amount of the work that can be done by braking, output acceleration is set to the acceleration ($\alpha$a) and, in a case where the kinetic energy is larger than the absolute value of the amount of the work that can be done by braking, the output acceleration is set to the deceleration ($\alpha$b).

* * * * *